Nov. 1, 1932.  C. L. MILLER, JR  1,885,750
LEG SUPPORT FOR AUTOMOBILE DRIVERS
Filed April 18, 1930
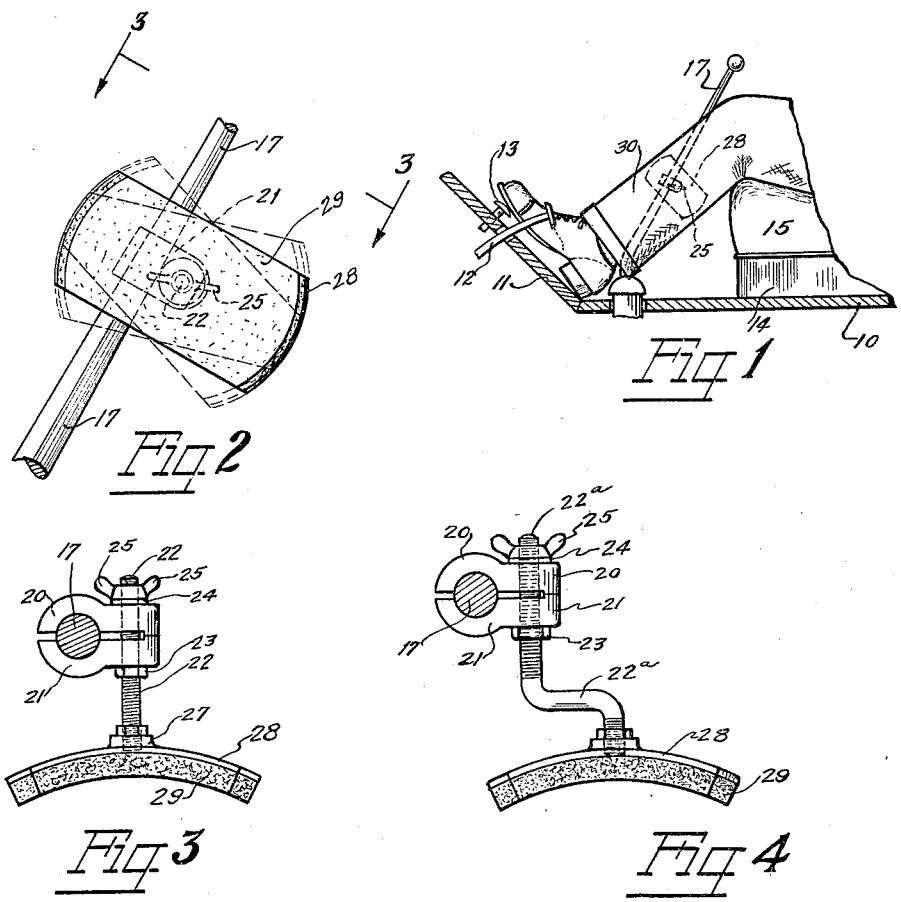
C. L. MILLER JR.,
INVENTOR.
BY
ATTORNEY.

Patented Nov. 1, 1932

1,885,750

UNITED STATES PATENT OFFICE

CALVIN L. MILLER, JR., OF CONCORD, NORTH CAROLINA

LEG SUPPORT FOR AUTOMOBILE DRIVERS

Application filed April 18, 1930. Serial No. 445,394.

This invention relates to a leg support and more especially to a support adapted to partially support the leg of the driver of an automobile which is used for feeding gasoline, and provides means for supporting said leg to prevent the same from becoming tired from long and continued use of the leg for depressing the accelerator of the automobile.

An object of my invention is to provide an adjustable support for one side of the leg of a driver which is used for operating the accelerator of the automobile, said support comprising means for adjustably securing the same to any desired support, and although I have shown it secured to the gear shift lever of an automobile, it is evident that this support can be secured to any other desired portion of the automobile, such as an up-standing projection secured to the floor board of the automobile, or to a projection secured to the front base portion of the seat of the automobile, or any other desired support for securing my support proper for holding the same in any desired position for partially supporting the leg of the driver.

Some of the objects of my invention having been stated other objects will appear as the description proceeds, when taken in connection with the accompanying drawing, in which—

Figure 1 is a side elevation of a portion of an automobile and the leg of the driver in position;

Figure 2 is a view of my support secured to the gear shift lever;

Figure 3 is a top plan view of my support taken along the line 3—3 in Figure 2;

Figure 4 is a slightly modified form of my invention showing a different type of connecting rod between the support proper and the clamp for securing the same to the gear shift lever.

Referring more specifically to the drawing the numeral 10 indicates the floor board of an automobile with the front portion of said floor board being indicated by the reference character 11 and brake pedal is indicated by the reference character 12 while the accelerator is indicated by reference character 13. The base of the seat portion which is indicated by the reference character 14 is adapted to have placed thereon the cushion 15, and the gear shift lever 17 projects upwardly from the floor board portion 10. All of this structure is conventional and is merely enumerated to show the relation of my invention thereto.

The gear shift lever is adapted to have secured thereto two clamping members 20 and 21 which are penetrated by a threaded bolt 22 which has an adjusting nut 23 on one side thereof, and the washer 24 and the thumb nut 25 on the other side thereof. This threaded rod 22 extends outwardly and is normally secured to the enlarged portion 27 on the plate 28, which plate has the resilient member 29 secured thereto by glue or any other suitable means, and this resilient portion 29 can be fibrous material, sponge rubber, or any other suitable material. This resilient portion 29 is adapted to press against the leg 30 of the driver, it being evident that the driver can lean his leg over against the support when it becomes tired, and in fact can lean it over there at all times to prevent it from becoming tired from continuous holding of the leg in one position and supporting the same merely from the engagement of the toe of the driver with the accelerator 13. It is evident that the rod 22 can be of any desired length or curvature as the rod 22a in Figure 4 is shown of a different form from the rod 22 in Figure 3. It is evident by means of such a rod as is shown in Figure 4 that the position of the support can be adjusted longitudinally of the machine as well as vertically of the same to cause the support to fit against the proper portion of the leg of the driver.

In the drawing and specification I have set forth a preferred embodiment of my invention, and although specific terms are employed, they are used in a generic and descriptive sense only, and not for purposes of limitation, the scope of the invention being set forth in the appended claim.

I claim:

A support for the leg of an automobile driver, adapted to be secured to the gear shift lever, comprising a curved plate, a resilient member secured to the front surface of said plate, and against which the leg of the driver may rest, a rod threadably engaging the rear surface of said plate, two clamping members adjustably secured on said rod, means on said rod for forcing said clamping members against the gear shift lever of the automobile to secure the support in position.

In testimony whereof I affix my signature.

CALVIN L. MILLER, Jr.